(12) United States Patent
Chang et al.

(10) Patent No.: US 10,068,380 B2
(45) Date of Patent: Sep. 4, 2018

(54) METHODS AND SYSTEMS FOR GENERATING VIRTUAL REALITY ENVIRONMENTS FROM ELECTRONIC DOCUMENTS

(71) Applicant: Adobe Systems Incorporated, San Jose, CA (US)

(72) Inventors: Walter Wei-Tuh Chang, San Jose, CA (US); Byungmoon Kim, Sunnyvale, CA (US); Laurel Alisa Warrell, St. Thomas (VG); Antoine Amanieux, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 57 days.

(21) Appl. No.: 15/354,042

(22) Filed: Nov. 17, 2016

(65) Prior Publication Data
US 2018/0137681 A1    May 17, 2018

(51) Int. Cl.
| | |
|---|---|
| *G09G 5/00* | (2006.01) |
| *G06T 19/00* | (2011.01) |
| *G06F 3/0482* | (2013.01) |
| *G06F 17/27* | (2006.01) |
| *G06F 17/21* | (2006.01) |
| *G06T 15/00* | (2011.01) |

(52) U.S. Cl.
CPC .......... *G06T 19/006* (2013.01); *G06F 3/0482* (2013.01); *G06F 17/21* (2013.01); *G06F 17/2705* (2013.01); *G06T 15/00* (2013.01)

(58) Field of Classification Search
CPC ..... G06T 19/006; G06T 15/00; G06F 3/0482; G06F 17/2705; G06F 17/21
See application file for complete search history.

(56) References Cited

U.S. PATENT DOCUMENTS

| | | | |
|---|---|---|---|
| 2007/0050341 A1* | 3/2007 | Hull | G06F 17/3002 |
| 2017/0200296 A1* | 7/2017 | Jones | G06T 11/60 |

OTHER PUBLICATIONS

Lin et al., Automatic Evaluation of Summaries Using N-gram Co-Occurrence Statistics, Jun. 2003, Proceedings of HLT-NAACL, pp. 71-78.*

* cited by examiner

*Primary Examiner* — Robert Craddock
(74) *Attorney, Agent, or Firm* — Kilpatrick Townsend & Stockton LLP

(57) ABSTRACT

Systems and methods are disclosed for generating a virtual reality environment from an electronic document by mapping image and text content extracted from the electronic document to a virtual reality module. A computing system performs a process to analyze an electronic document to identify the document elements that occur within the electronic document. The document elements are parsed to identify candidate images that have minimum image characteristics suitable for virtual reality. One or more of the candidate images are inserted into the virtual reality module. Text elements related to the candidate images are also inserted into the virtual reality module. Upon execution of the virtual reality module by a virtual reality viewing device, the text and image elements from the electronic document are presented in a virtual reality environment to the viewer for non-linear exploration and reading.

20 Claims, 11 Drawing Sheets

FIG. 4

| Line # | Position in Doc. | Selected Text Line(s) |
|---|---|---|
| 1 | L0001 | 6/27/2016 [...] Berlin Teufelsberg: NSA spy station on buried Nazi college. |
| 2 | L0002 | [...] Berlin Teufelsberg: NSA spy station on buried Nazi college- |
| 3 | L0011 | They became known as Trümmerfrauen or 1/64 6/27/2016 IMAGE image-001.jpg [...] Berlin Teufelsberg: NSA spy station on buried Nazi college. |
| 4 | L0021 | The first mobile units took up position atop the hill in July 1961, with more permanent facilities following in 1963 before [...] Berlin Teufelsberg gradually grew over the following years to become one of the West's largest spying stations ever arguably the most important. |
| 5 | L0022 | 2/64 6/27/2016 [...] Berlin Teufelsberg: NSA spy station on buried Nazi college. |
| 6 | L0044 | 3/64 6/27/2016 [...] Berlin Teufelsberg: NSA spy station on buried Nazi college. |
| 7 | L0066 | 4/64 6/27/2016 [...] Berlin Teufelsberg: NSA spy station on buried Nazi college. |
| 8 | L0081 | what [...] Berlin Teufelsberg, former Cold War spy station or listening post, brought back into the public eye recently in the wake of the NSA spying revelations. |
| 9 | L0087 | 5/64 6/27/2016 [...] Berlin Teufelsberg: NSA spy station on buried Nazi college. |

FIG. 5

METHODS AND SYSTEMS FOR GENERATING VIRTUAL REALITY ENVIRONMENTS FROM ELECTRONIC DOCUMENTS

TECHNICAL FIELD

This disclosure relates generally to computer-implemented methods and systems and more particularly relates to methods and systems for generating virtual reality environments from electronic documents.

BACKGROUND

PDF documents, word processing documents, web pages, and other electronic documents conventionally present a linear reading experience. These types of document can be considered "2-dimensional," "flat," or otherwise "linear," in the sense that they are meant to be read and viewed sequentially. Linear electronic documents are therefore not optimized for use with virtual reality (VR) technologies, which pose an entirely new paradigm for experiencing content in a more engaging and immersive manner. As VR content gains rapid consumer traction and adoption, there is an immediate problem of how the content in traditionally presented linear electronic documents can be transformed into VR content to provide more compelling experiences than simply viewing the electronic documents via traditional mediums (i.e. via reading text and viewing images on a webpage, or in the graphical user interface of a word processing program or PDF reader).

SUMMARY

The systems and methods disclosed herein involve techniques for generating virtual reality environments from conventional linear electronic documents, such as PDF documents and word processing documents. A virtual reality mapping module executing in a computing system analyzes an electronic document to identify the document elements that occur within the electronic document. The document elements comprise, for example, image and text elements in the document. The virtual reality mapping module also parses the document elements to identify candidate images that include minimum image characteristics that indicate that an image is suitable for virtual reality. An example of a minimum image characteristic is a minimum field of view characteristic. The virtual reality mapping module also parses the document elements to identify text elements that are located within a proximity of the candidate images. In an electronic document, text within the vicinity of an image indicates descriptive text for that image. In some embodiments, the virtual reality mapping module selects the text elements to be added to the virtual reality environment based on the proximity of the text elements to candidate images. In additional embodiments, the virtual reality mapping module selects the text elements to be added to the virtual reality environment based on the co-occurrence of N-gram sequences.

In additional techniques described herein, the computing system generates N-gram sequences of text from the text elements. The N-gram sequences of text indicate the probability of whether the sequence occurs within a given portion of the electronic document. Frequently occurring N-gram sequences indicate potential topics describing content in the electronic document. The frequently occurring N-gram sequences are included in online search queries to identify additional images that have the minimum image characteristics suitable for virtual reality. The virtual reality mapping module uses a combination of images found online using techniques described herein and from within the document to present an immersive and substantially seamless virtual reality environment to the user.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where:

FIG. 4 is a table depicting an example of a list of N-gram sequences, according to certain embodiments disclosed herein.

FIG. 5 is a table depicting an example of a list of co-occurring N-gram sentences in the electronic document, according to certain embodiments disclosed herein.

DETAILED DESCRIPTION

Figure 1:
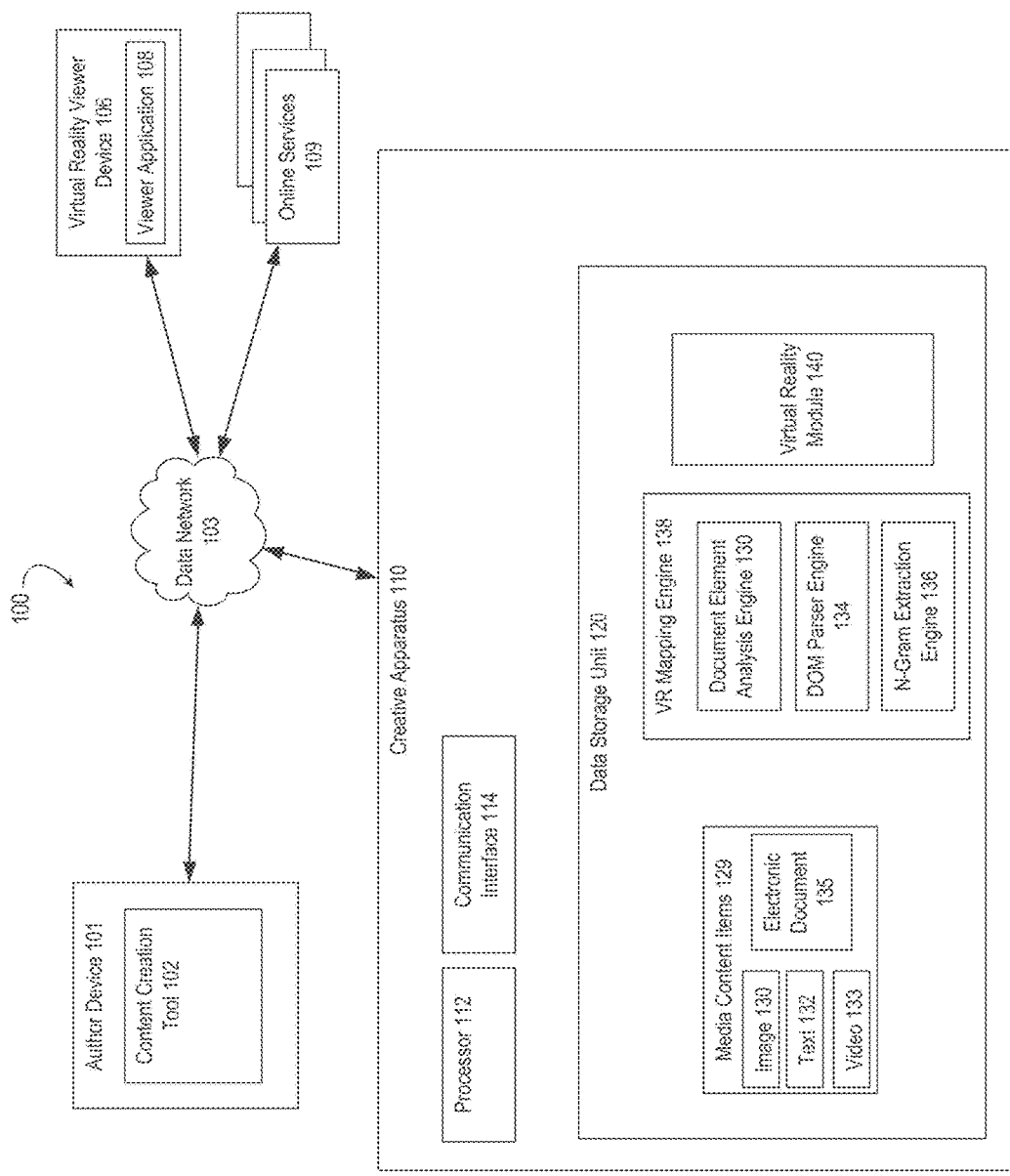
FIG. 1 is a block diagram depicting an example of a computing environment mapping content from an electronic document to a virtual reality environment, according to certain embodiments disclosed herein.

Systems and methods are provided for transforming a linear electronic document into a virtual reality module that, when executed using a virtual reality device, presents an immersive and explorative virtual reality environment that includes image and text content extracted from the electronic document. In one example, using the techniques disclosed herein, a document author is able to generate an immersive virtual reality module from a portable document format (PDF) document. In embodiments disclosed, a computing system executes a virtual reality mapping module that processes an electronic document to map image and text content from the electronic document to a virtual reality module. In executing this process, the computing system first identifies document elements in the electronic document. Examples of document elements include document metadata and tags embedded in the document that identify the images and text in the document. The virtual reality mapping module parses the document elements to identify images in the electronic document that have image characteristics suitable for virtual reality. For example, images with a minimum field of view value indicate an image that may be suitable for virtual reality. The virtual reality mapping module then inserts at least one of the identified images into the virtual reality module. The virtual reality mapping module may also insert additional images in the virtual reality module and stitch the different images together to create immersive panoramic images. Once executed, the virtual reality module presents the inserted images to the user in an immersive virtual reality environment.

Sometimes, the electronic document may not include images that have the minimum image characteristics that are suitable for virtual reality. For example, an electronic document may include images that are in black and white, have a limited field of view, or the electronic document may not include any images at all. In embodiments herein, the virtual reality mapping module also executes a process for identifying relevant images that include minimum image characteristics for VR through an online search. To accomplish this, the virtual reality mapping module parses the text elements in the electronic document to generate N-gram sequences of text fragments from the electronic document. The N-gram sequences of text fragments indicate the probability of certain sequences of text occurring within a portion of the document. Using one or more of the N-gram sequences of text, the virtual reality mapping module initiates a search query to one or more online image databases. The virtual reality mapping module downloads the external images (i.e. external to the document) found in the search results and identifies external images that have the minimum characteristics for virtual reality. The virtual reality mapping module then inserts at least one of the external images into the virtual reality module. The selection of the external images for insertion is performed either through a guided process via a user interface presented to the user or automated via the virtual reality mapping module.

In additional embodiments, the virtual reality mapping module also identifies document text occurring within the vicinity of the extracted images and inserts the document text in the virtual reality module at positions within the proximity of the corresponding inserted images in the virtual reality module. The text is added as an annotation layer on top of the images so that, when the user navigates to defined positions while in the virtual reality environment, the corresponding text providing narrative context for the images appears as a pop up layer.

The embodiments disclosed herein thus allow a document author to create an interactive experience for users in virtual reality. Instead of being limited to a static and linear reading of document content, techniques herein allow a user to enter a virtual reality environment to read the text of an electronic document while exploring an immersive virtual reality world. The virtual reality world that includes content directly from the electronic document and additional content downloaded from online sources so that the user experiences the content in a non-linear and explorative manner.

These illustrative examples are given to introduce the reader to the general subject matter discussed here and are not intended to limit the scope of the disclosed concepts. The following sections describe various additional aspects and examples with reference to the drawings in which like numerals indicate like elements.

Referring now to the drawings, FIG. 1 is a diagram of an environment 100 in which one or more embodiments of the present disclosure can be practiced. The environment 100 includes an author device 101 that is connected to a creative apparatus 110 via a network 103. A user of the author device uses various products, applications, or services supported by the creative apparatus 110 via the network 106. For example, the author device 101 executes computer-readable code to provide a content creation tool 102 to the author device 101. The content creation tool 102 provides user interface to the author for interacting with the creative apparatus 110. The creative apparatus 110 executes one or more software modules to enable the features of the embodiments disclosed herein—generating virtual reality modules 140 from electronic document 135 provided as inputs to the creative apparatus 110. Via the content creation tool 102, the author provides the corresponding media content (e.g., electronic documents 135) to the creative apparatus 110 and in some embodiments, customizes the mapping of the images and text from the electronic document 135 to the virtual reality module 140.

The author device 101 correspond to various users. Examples of the users include, but are not limited to, creative professionals or hobbyists who use creative tools to generate, edit, track, or manage creative content, marketing professionals who use marketing tools to generate, edit, track, or manage online content, or to manage online marketing process, end users, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manages digital experiences. Examples of the author device 101 include, but are not limited to, a personal computer (PC), tablet computer, a desktop computer, a processing unit, any combination of these devices, or any other suitable device having one or more processors.

As mentioned above, authors operate the content creation tool 102 in the author device 101 connect to and interface with the creative apparatus 110 over data network 103. Examples of the data network 103 include, but are not limited to, internet, local area network (LAN), wireless area network, wired area network, wide area network, and the like.

The creative apparatus 110 includes a processor 112 communicatively coupled to a communications interface 114 and a data storage unit 120. The communication interface 114 includes any device or group of devices suitable for establishing a wired or wireless data connection to the data network 103. Non-limiting examples of the communication interface 114 include an Ethernet network adapter, a modem, and/or the like. The creative apparatus 110 transmits messages as electronic or optical signals via the communication interface 114. For example, the creative apparatus 110 receives inputs from and provides outputs to the author device 101 via communication interface 114. The processor 112 executes computer-executable program code and/or accesses information stored in the data storage unit 120. The processor 112 comprises, for example, a microprocessor, an application-specific integrated circuit ("ASIC"), a state machine, or other processing device. The processor 112 includes one processing device or more than one processing device. Such a processor includes or may be in communication with a computer-readable medium storing instructions that, when executed by the processor 112, cause the processor to perform the operations described herein.

The data storage unit 120 includes any suitable non-transitory computer-readable medium. The computer-readable medium includes any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions include processor-specific instructions generated by a compiler and/or an interpreter from code written in any suitable computer-programming language, including, for example, C, C++, C#, Visual Basic, Java, Python, Perl, JavaScript, and ActionScript.

The data storage unit 120 also stores media content items 129 that may be used by the author/creative professional to perform operations herein. The media content items 129 include, for example, image files 130, text files 132, video files 133, and electronic document files 135. Electronic document files 135 include any conventional document that provides a linear reading experience to a user. Examples of electronic documents 135 include word processing documents, PDF documents, and the like.

The creative apparatus 110 executes the program code to configure the processor 112 to perform the operations described herein. For example, the program code includes a virtual reality mapping engine 138, which includes one or more sub-modules such as a document element analysis engine 130, document object model (DOM) parser engine 134, and an N-Gram Extraction engine 136. Upon execution of the VR mapping engine 138 (and the corresponding sub-modules for the VR Mapping Engine 138), the creative apparatus generates a virtual reality module 140 from the electronic document 135 and other media content items 129 selected by the author.

The virtual reality module 140 comprises a set of packaged computer instructions that are executable by a virtual reality viewer device 106 to display to a user a virtual reality environment. For example, the virtual reality viewer device 106, which is connected to the creative apparatus 110 and the author device 101 over data network 103, obtains the virtual reality device module 140 over data network 103. The virtual reality viewer device 106 comprises, for example, a headset that presents a separate display to each eye as a user wears the headset. In some aspects, the virtual reality viewer device 106 executes a viewer application 108 that is capable of reading and executing different virtual reality environments presented in different virtual reality modules (e.g., virtual reality module 140).

Through embodiments herein, the virtual reality module 140 executes program code to display a virtual reality environment that comprises a portion of the text and image content of electronic document 135 in an immersive manner. For example, a 180 degree panoramic image found in the electronic document 135 is presented via the virtual reality module 140 as a panoramic image that the user navigates via head movements as the user manipulates the virtual reality viewer device 106. In some embodiments, the VR mapping engine 138 also identifies external images found from online services 109. For example, the VR mapping engine 138 parses text elements from the electronic document 135 to initiate an online search query to online image databases among online services 109 (e.g., image services from Internet search engines). Taking the example where the electronic document 135 included a 180 degree panoramic image, the VR mapping engine 138 initiates a search query to identify the corresponding 180 degree panoramic image that depicts the second half of the environment. Through image processing techniques, the VR mapping engine 138 then stitches together the two 180 degree panoramic images to create an immersive 360 degree panoramic included in the virtual reality module 140. Upon execution of the virtual reality module 140, the virtual reality viewer device 106 presents the full 360 degree image to the user. In some embodiment, the VR mapping engine 138 may determine that multiple images formats are available within the electronic document 135 and/or via external sources and may insert all such options into the virtual reality module 140. In these cases, the virtual reality module 140 may select the image format (e.g., 360 degree panoramic or 180 degree panoramic) to present within the virtual reality environment depending on the viewing capabilities of the virtual reality viewer device 106 or any other viewer used to view the virtual reality module 140.

One skilled in the art would understand that the VR mapping engine 138 and sub-modules comprising the document element analysis engine 130, DOM parser engine 134, and N-gram extraction engine 136 are shown as executable computer modules in data storage unit 120 (which is part of or accessible by creative apparatus 110) for illustrative purposes. In other embodiments, the VR mapping module 120 and corresponding sub-modules may also be included in a data storage device included in the author device 101.

Figure 2:
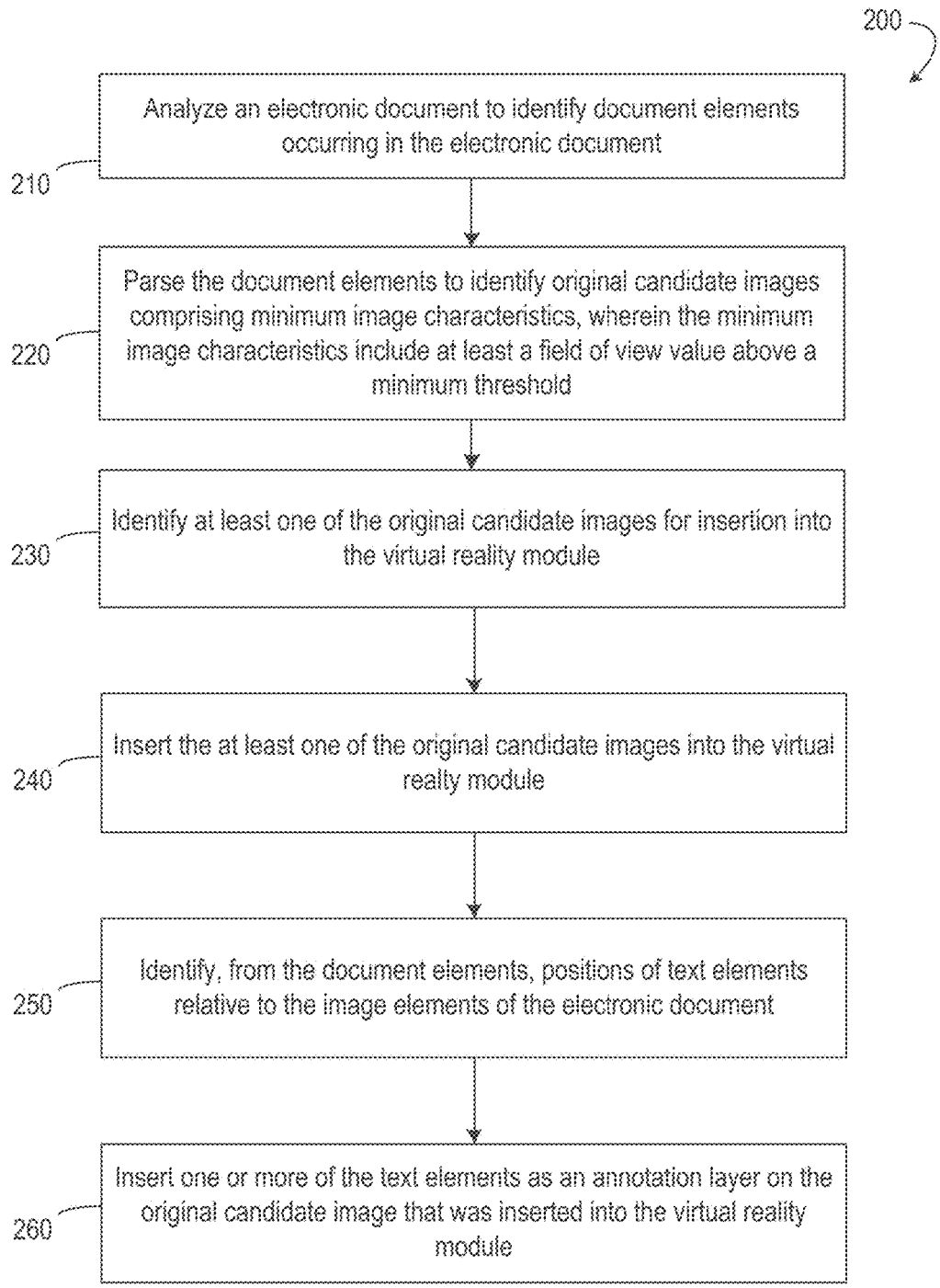
FIG. 2 is a flowchart illustrating an illustrative method for mapping content from an electronic document to a virtual reality environment, according to certain embodiments disclosed herein.

FIG. 2 is a flowchart depicting an example process 200 for generating a virtual reality module from an electronic document, the virtual reality module comprising image and text extracted from the electronic document to provide content from the document as a non-linear experience. The process 200 is implemented as a software algorithm that is executed by one or more of the components listed in FIG. 1 or in any suitable computing or communication environment. For example, the steps of process 200 may be embodied in program code (i.e. VR mapping engine 114 and corresponding sub-modules) stored in a computer-readable medium (i.e. the data storage unit 120), the program code executed by a processor for the creative apparatus 110.

The process 200 includes analyzing an electronic document to identify document elements occurring in the electronic document, as shown in block 210. The author operating author device 101 selects inputs in the user interface presented by the content creation tool 102 to identify electronic document 135 as the input to the VR mapping module software 138. The creative apparatus 110 executes the software process indicated by the computer code in the VR mapping module 138 and initiates the document element analysis module 130.

The document elements in an electronic document comprise the individual components that make up an electronic document. For example, identification of the document elements include identification of the pages, title, sections, headings, image elements, paragraphs, text segments, and other components. Some electronic documents may include embedded tags or metadata that provide the identification of the document elements. For example, for PDF documents, the original PDF author is able to generate the PDF with embedded extensible metadata platform (XMP) tags. As another example, HTML documents include HTML tags that identify the document elements. In some embodiments, the document element analysis module 130 analyzes the document elements by identifying the document tags/metadata (e.g., XMP tags/HTML tags, or other formats of embedded tags/metadata) that are present in the electronic document. In the case of a PDF document, the document element analysis module initiates a pdfMakeAccessible module to identify the PDF elements. In other instances, the electronic document may be a static document that does not include any tags or metadata. In such embodiments, the document element analysis module 130 performs image analysis and processing techniques (e.g., optical character recognition (OCR)) to automatically identify and extract the text and image elements from the electronic document.

By analyzing the document elements, the document element analysis module 130 identifies the document elements in reading order. For example, in a multi-column document, text appears on two or more columns of each page. The proper reading order in a multi-column document comprises reading the sentences and paragraphs of the document down the first column of a page, then continuing the order down a second column, and so on. By identifying the document elements in reading order, the identified text elements of the document elements are identified such that the reading order is preserved (i.e. in multi-column documents, the text elements are identified as text that runs down a first column then continues down a second column for each page).

In some embodiments, document element analysis module 130 analyzes the electronic document to identify document elements and outputs a document object model (DOM) data structure that includes the document elements.

The process 200 further includes parsing the document elements to identify original candidate images comprising minimum image characteristics, as shown in block 220. As mentioned above, the document elements comprise text elements (e.g., paragraphs, text segment runs, etc.) and image elements. The image elements identify the images that are presented in the electronic document. Original candidate images are images presented in the electronic document that show certain characteristics that indicate that the images are suitable for virtual reality. One example of a minimum image characteristic is a threshold minimum value for a field of view value. For example, the document element analysis module 130 may have identified multiple images in the electronic document, some images having a larger field of view than others. An image with a field of view value of 180 degrees or larger indicates a panoramic image that is suitable for virtual reality. The minimum threshold value for the field of view is programmable and the VR mapping module 138 can be configured with different field of view values according to the needs of the content author. Other image characteristics include the image dimension, color mapping, image saliency, and other image characteristics.

To identify the original candidate images, the VR mapping module 138 executes the DOM parser module 134 to parse through the document elements identified by the document element analysis module 130. There are multiple embodiments in which the DOM parser module 134 is able to identify the image elements depending on the format and structure of the electronic document 135.

In one embodiment, the electronic document 135 includes embedded or associated metadata/tags (i.e. metadata/tags embedded as part of the document or provided as separate files linked to the document). The metadata/tags for images indicate the image characteristics, such as field of view, depth of field, etc. In some aspects, the document elements may include metadata tags that identify images within the document that are VR ready (i.e. indicating that a given image includes minimum image characteristics for virtual reality). The DOM parser module 134 examines the metadata to detect whether the image includes minimum image characteristics.

In another embodiment, the electronic document 135 does not include any metadata/tags to indicate whether any of the images are VR ready. In this embodiment, the DOM parser module 134 executes an image classifier process that, through image processing techniques, analyzes each image in the electronic document to determine the image characteristics of each image. For example, the DOM parser module 134 identifies the field of view, color, depth of field, and other characteristics of each image and then classifies the candidate images according to the strength of the image characteristics for VR. For example, the DOM parser module 134 classifies the candidate images in a document by decreasing order of field of view value and whether the documents are in color. Through image analysis techniques, the DOM parser module 134 identifies the potential candidate images that would be suitable (i.e. include minimum image characteristics) for virtual reality.

The process 200 also includes a step for identifying at least one of the original candidate images (i.e. images found within the electronic document 135 that satisfied minimum image characteristics) for insertion into the virtual reality module, as shown in block 230. For example, via an automated process, the VR mapping module 138 selects a candidate image having the highest field of view value among multiple original candidate images from the document. In other embodiments, the VR mapping module 138 enables a guided process for image selection via a user interface presented on the content creation tool 102 on the author device 101. In such embodiments, the content creation tool 102 receives, from the creative apparatus 110, multiple images identified as meeting the minimum image characteristics for VR. The author, via inputs provided to the user interface, selects one or more of the candidate images for insertion into the virtual reality module.

The process 200 also includes a step for inserting at least one of the original candidate images into the virtual reality module, as shown in block 240. The virtual reality module 140 comprises packaged program code that is in a computer-readable format for the virtual reality viewer device 106. The VR mapping module 138 inserts the original candidate image (i.e. the image identified in block 230 as described above) into the virtual reality module 140 by mapping the image to the format suitable for the virtual reality viewer device 106. Upon execution of the virtual reality module 140 by the virtual reality viewer device 106, the inserted image is viewable by a user/wearer of the virtual reality viewer device. FIGS. 6-11 below depict examples of various scenes of a virtual reality environment based on images inserted from an electronic document.

In some embodiments, multiple candidate images are identified for insertion into the virtual reality module 140. For example, the electronic document 135 may include multiple panoramic images that are selected for insertion into the virtual reality module 140. A first image comprises a 180 degree panoramic photo of a real world environment. A second image comprises the other 180 degree panoramic photo that completes the full 360 degree photographic representation of the real world environment. A third image in the electronic document comprises a second area of the real world environment (e.g., the first and second photographs may depict the real world environment outside of a popular tourist attraction, and the third photograph reveals the interior of the tourist attraction). The VR mapping module 138 inserts each of the identified images into the virtual reality module 140 by stitching together (via image processing techniques) the first photograph and the second photograph to generate a 360 degree panoramic view for the virtual reality module 140. Further, the VR mapping module 138 inserts the third photograph into the virtual reality module 140 as a separate area of the virtual reality world.

In some embodiments, the VR mapping module 138 leverages the typical structure of the electronic document 135 to guide placement of images and other content into the virtual reality module 140 as additional VR areas. In one embodiment, later images and content are classified as occurring temporally later in the narrative structure of the electronic document 135 and therefore are placed in VR areas beyond the immediate VR area that is displayed upon engagement in the VR experience. As subsequent VR-potential images and content are extracted from the document, additional VR areas are created, allowing the user to navigate through the narrative sequence described by the electronic document 135. In an alternate embodiment, the N-gram analysis is used to make a threshold mapping of the document to determine if subsequent VR areas are either different and narratively distinct topics, which would be treated as described above, or are detailed explorations of a preceding topic. If the VR mapping module 138 determines that a detailed exploration is occurring (through N-gram analysis to discover word and sentence similarity), then the new VR areas may be clustered around the primary VR area which is being explored. Other methods of organizing and presenting VR areas to the user are also envisioned.

Figure 10:
FIG. 10 is a first view of a virtual reality environment in which a user navigates between scenes using a teleportation portal, according to certain embodiments disclosed herein.
Figure 11:
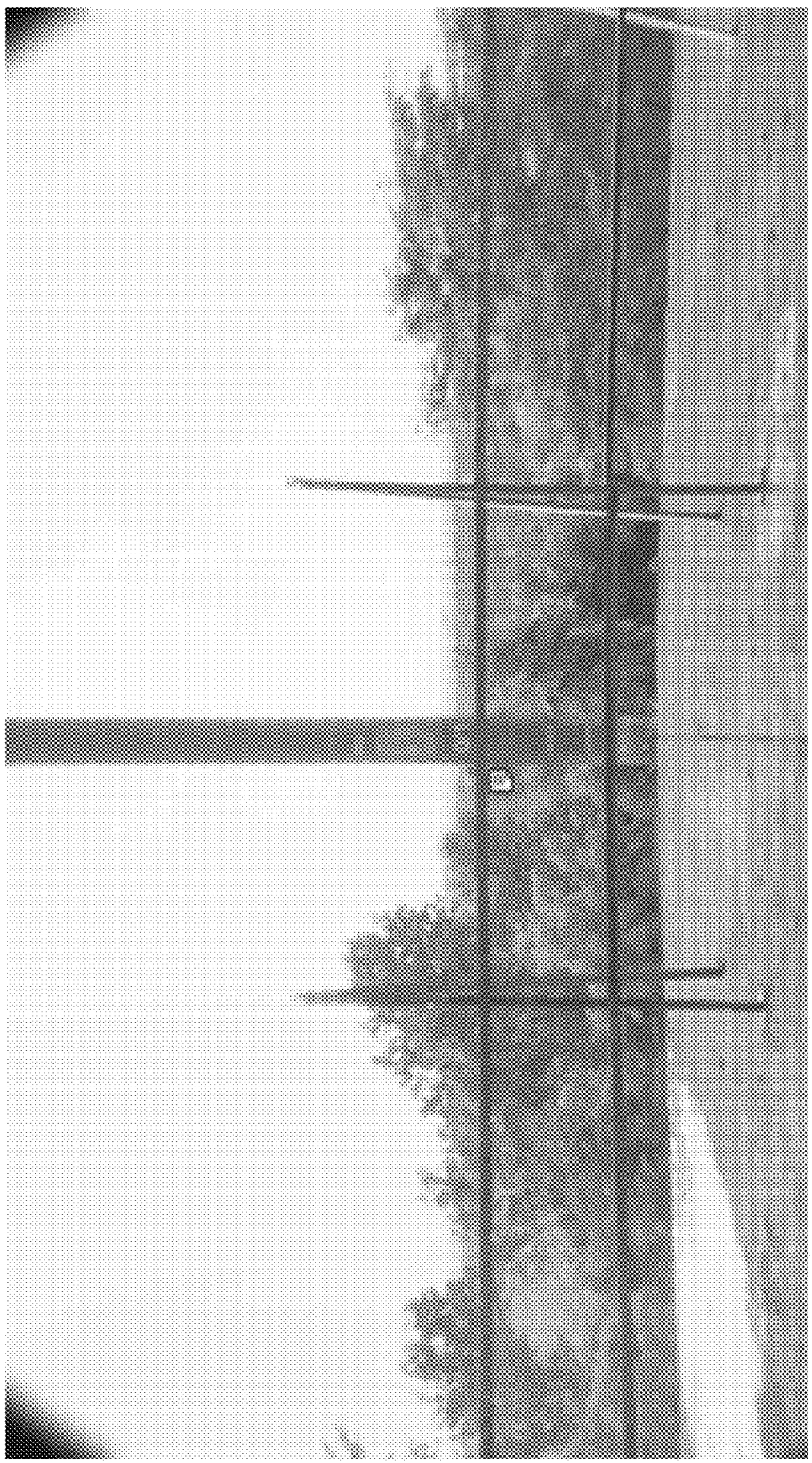
FIG. 11 is a second view of a virtual reality environment in which a user navigates between scenes, according to certain embodiments disclosed herein.

Upon execution of the virtual reality module 140 by the virtual reality viewer device 106, the viewer is presented with a 360 degree panoramic view of the real world environment shown in the first and second photographs. The viewer further manipulates the photograph to allow the viewer to interact with the virtual reality world by moving from one area to another (i.e. moving from outside of the tourist action to the interior of the tourist attraction by presenting the third photograph in the virtual reality environment). Examples of moving from one area to another by presenting two different images that were inserted into the virtual reality module 140 are shown in FIGS. 10 and 11 and discussed further below.

In block 250, the process 200 further includes identifying, from the document elements, positions of text elements relative to the image elements of the electronic document. An electronic document 135 may include text around the proximity of an image within the electronic document. Text near an image on a page is more likely to describe the image than text further away. For example, image captions surround an image within an electronic document that describe the image. The positions of the text elements may be identified by standard image processing and optical character recognition techniques. For example, the (x, y, w, h) bounding box for sentence fragments is used to determine the linear distance to the center of an image. The text elements that are positioned within a threshold proximity of an image is selected as a text annotation for the virtual reality module 140. The threshold proximity value is a programmable value, configurable by the author device 101.

Figure 7:
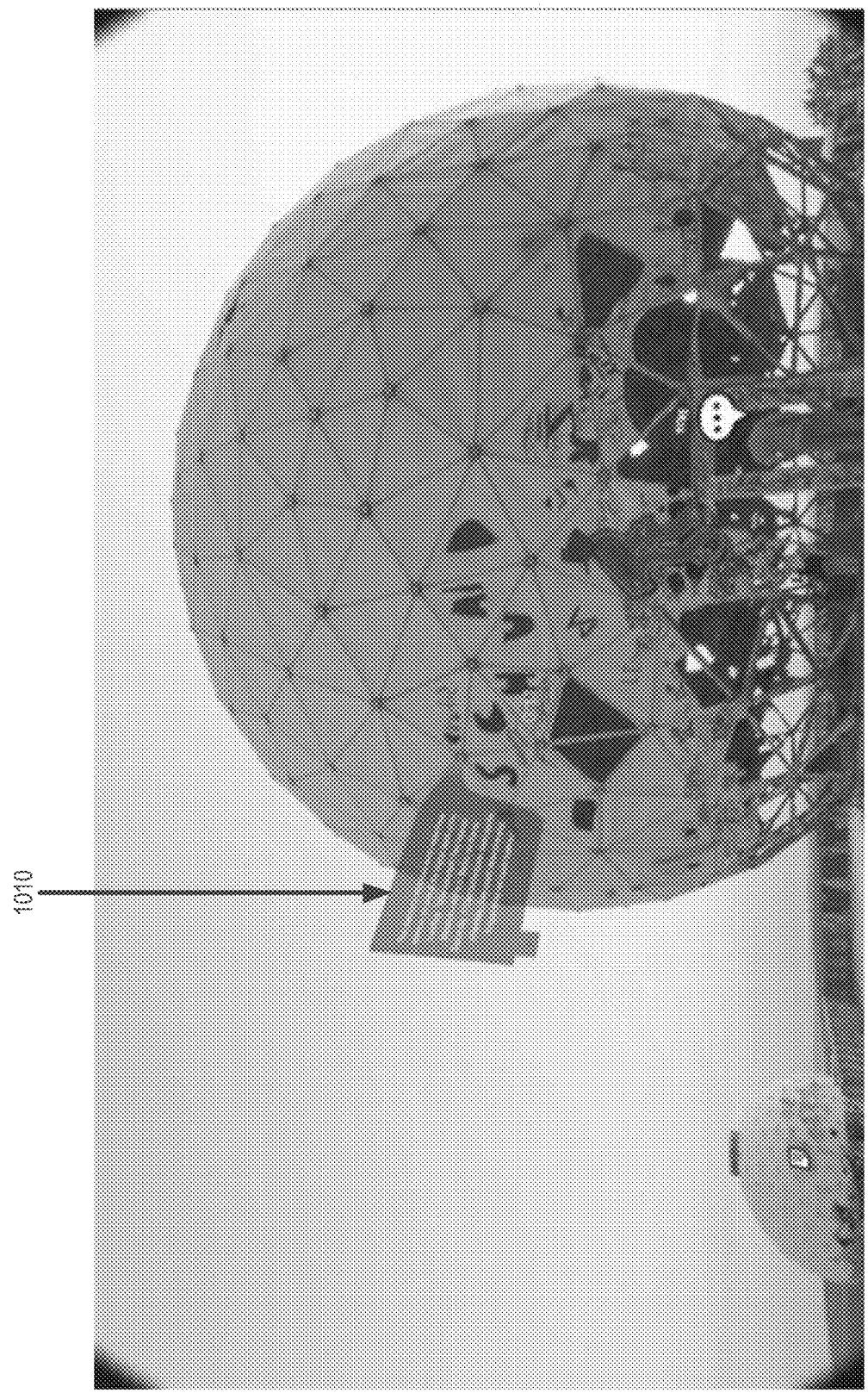
FIG. 7 is a second view of a virtual reality environment generated using techniques of certain embodiments disclosed herein.
Figure 8:
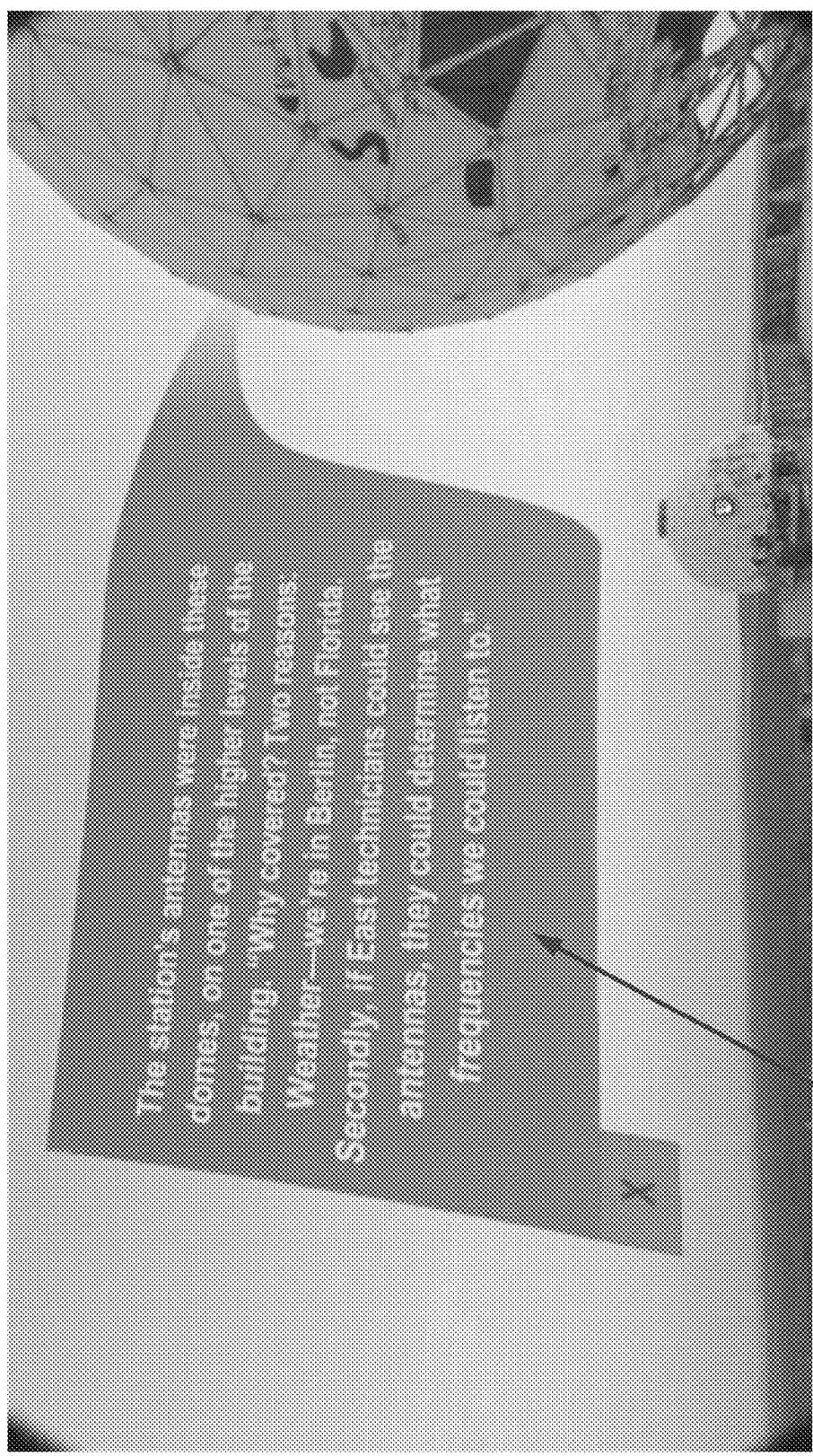
FIG. 8 is a third view of a virtual reality environment generated using techniques of certain embodiments disclosed herein.

In block 260, the process 200 further includes inserting one or more of the text elements as an annotation layer on the original candidate image that was inserted into the virtual reality module. By inserting the text elements as an annotation layer, upon execution of the virtual reality module 140 by the virtual reality viewer device 106, the inserted text layer is shown as a pop-up window or other interface while the user is exploring and interacting in the virtual reality environment. FIGS. 7-8 depict examples of a text pop up annotation appearing on the virtual reality interface as a user navigates the virtual reality environment comprising image and text elements extracted and mapped from an electronic document 135.

In case of single text annotations that serve as a title or descriptive block for an image, the single text annotation is inserted as an annotation object in the center of the virtual reality image. In the case of multiple candidate annotations, the multiple candidate annotations are ranked via N-gram analysis and topic identification methods. For example, in an automated process, the text elements selected for annotation may also be automatically and intelligently selected by the VR mapping module 138 by computing N-gram sequences of text from the document elements and identifying top N-gram sequences that occur within threshold proximity of image elements that have been inserted into the virtual reality module 140. Techniques for topic identification from N-gram identification are discussed further below with respect to FIGS. 3 and 5. Further, the user of author device 101 can manually select and place annotations through a guided process as described further below.

In embodiments where the electronic document 135 is mapped to a virtual reality module 140 via a guided process, the content creation tool 102 presents a user interface on a display of the author device 101 for selection and insertion of both the identified text and image elements. Once the VR mapping module 138 analyzes the electronic document and parses the text and image elements to identify original candidate images (as discussed above via steps 210-220), the user interface of the content creation tool 102 presents a list of potential image elements to the operator of author device 101. Further, upon identifying the text elements within the electronic document and the positions of said text elements, the VR mapping module 138 presents a list of the document text to the user interface, ranked by proximity to the images that were selected for insertion to the virtual reality module 140. The content creation tool 102 receives inputs from the user indicating the text elements to insert as annotation layers in the virtual reality module 140.

In some scenarios, the electronic document 135 does not include images that have the minimum image characteristics to be suitable for virtual reality. For example, the electronic document 135 may include black and white images that have a field of view value smaller than a programmable threshold value. In these scenarios, the VR mapping module 138 initiates a process to identify additional images from online sources that are related to the content of the electronic document suitable for virtual reality.

Figure 3:
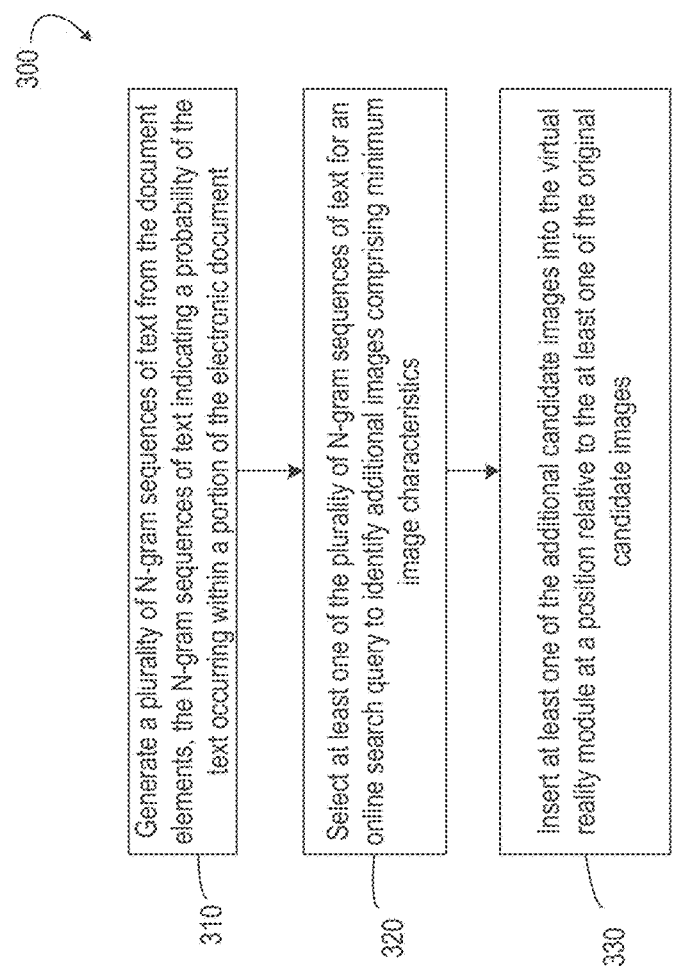
FIG. 3 is a flowchart illustrating a method for identifying content topics via N-gram sequences and using the content topics to identify potential virtual reality images from online sources, according to certain embodiments disclosed herein.

FIG. 3 depicts a process 300 for identifying external candidate images (i.e. external in that they are external to the electronic document 135 and not part of the electronic document 135) from online sources. An N-gram extraction module 136, part of the VR mapping module 138, parses through the document elements identified by the document element analysis module 130 and generates a plurality of N-gram sequences of text from the document elements. N-grams are continuous sequences of 'N' number of terms from a given sequence of text. N-gram sequences of text are generated from the document elements using N-gram extraction methods. In embodiments herein, the N-grams are computed across the text of electronic document 135. Further, for all word sequences found after stopword filtering and stemming processing, given $w_1, w_2, \ldots, w_i$, the N-gram probability is computed to identify the optimal topic terms of the electronic document 135 that will be suitable for initiating online image searches.

For example, in an N-gram model, the probability $P(w_1, \ldots, w_m)$ of observing the sentence $w_1, \ldots, w_m$ is approximated by:

$$P(w_1, \ldots, w_m) = \prod_{i=1}^{m} P(w_i \mid w_1, \ldots, w_{i-1}) \approx \prod_{i=1}^{m} P(w_i \mid w_{i-(n-1)}, \ldots, w_{i-1})$$

The N-Gram extraction module 136 calculates the conditional probability from N-gram frequency counts:

$$P(w_i \mid w_{i-(n-1)}, \ldots, w_{i-1}) = \frac{\text{count}(w_{i-(n-1)}, \ldots, w_{i-1}, w_i)}{\text{count}(w_{i-(n-1)}, \ldots, w_{i-1})}$$

Figure 4:
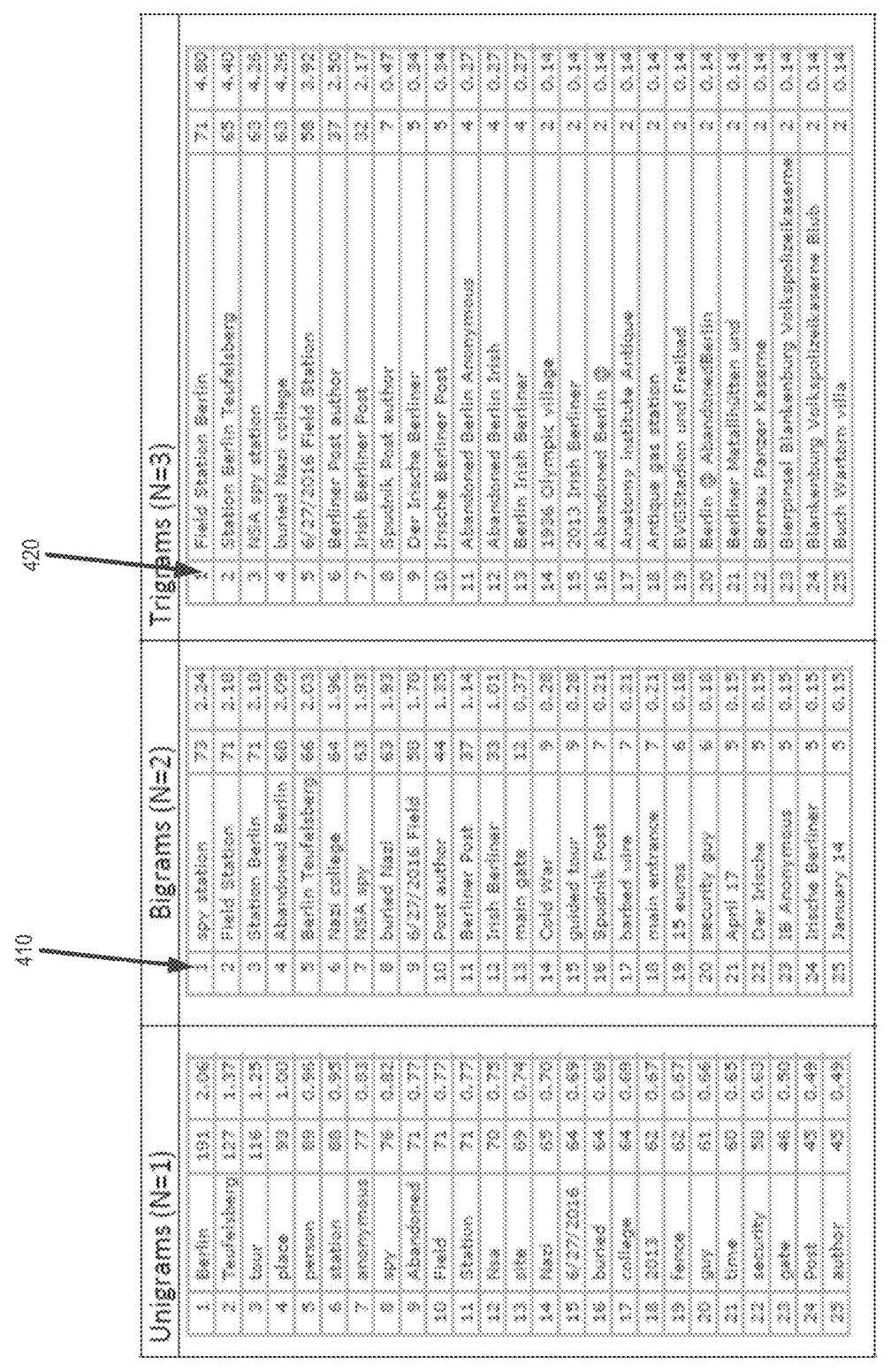

The N-gram extraction module 136 applies the above equations to the text elements identified in the document elements to generate the plurality of N-gram sequences of text. The N-gram sequences of text further indicate a probability of the text occurring within a certain portion of the document. FIG. 4 depicts an example of a plurality of N-gram sequences of text for N=1 (unigrams), N=2 (bigrams), and N=3 (trigrams). N-gram sequence 410, for example, indicates that the N-gram sequence "spy station" occurs 73 times within electronic document 135 and has a 2.24% chance of appearing for any given portion of the electronic document 135. Similarly, the N-gram sequence 420 indicates that the N-gram sequence "Field Station Berlin" occurs 71 times within the electronic document 135 and has a 4.8% chance of appearing at any given portion of the electronic document 135. The N-gram sequences of text thus indicate a relative importance of sequences of text as they occur within the document, allowing the VR mapping module 138 to identify the major topics of an electronic document 135 through intelligent and automatic processes. For example the N-gram sequences of text, ranked by order of probability of occurrence, indicate a likely order of topics. In the example shown in FIG. 4, "Berlin", "Teufelsberg", "spy station", "Field station", "Field Station Berlin" are frequently occurring sequences of text within electronic document 135 and indicate likely topic candidates for the electronic document 135.

Returning to FIG. 3, the process 300 further includes selecting at least one of the plurality of N-gram sequences of text for an online search query to identify additional images comprising minimum image characteristics, as shown in block 320. The VR mapping module 138 selects, for example, the top X number of unigrams, bigrams, and trigrams as potential topics that depict the content of the electronic document, X being a programmable number. In additional embodiments, the N-gram sequences are presented in order of probability of occurrence to the user interface of the content creation tool 102, and an operator of author device 101 is able to select one or more of the N-gram sequences through a guided process.

The VR mapping module 138 transmits the selected N-gram sequences of text to one or more online services 109 (i.e. image services such as search engines for retrieving images) as online search queries. The VR mapping module 138 additionally concatenates contextual search terms using the following regular expression:

N-Gram X(VR|360|Panorama)

Where "N-Gram X" refers to an N-Gram sequence. The additional contextual search terms are added to increase the likelihood of retrieving images from the online image searches that have minimum image characteristics suitable for virtual reality. The VR mapping module 138 repeats the search using all possible permutations of the top X number of N-grams (including unigrams, bigrams, and tri-grams).

The online image search returns, to the virtual reality module 140, a list of potential external candidate images. Through the process described above with respect to block 220 in FIG. 2, the virtual reality module 140 identifies one or more candidate images from the external candidate images that include minimum image characteristics suitable for virtual reality. Because the image search was initiated with the top ranking N-grams, which have a high likelihood of corresponding to the topics describing the content of the electronic document 135), the VR mapping module 138 is able to intelligently and automatically identify additional images that are relevant to the content of the electronic document.

In some embodiments, the list of candidate images is presented to the content creation tool 102. The operator of author device 101 is able to manually refine the selection of the additional candidate image for insertion into the virtual reality module 140.

The process 300 further includes inserting at least one of the additional candidate images into the virtual reality module, as shown in block 330. The VR mapping module 138 inserts the selected additional candidate image (i.e. the images selected from the online search query) to the virtual reality module 140 via the process described above with respect to 240.

The VR mapping module 138 may identify candidate images for insertion into the virtual reality module 140 through a combination of methods described above with respect to blocks 220-230 and 320. For example, the VR mapping module 138 first identifies the potential original candidate images having minimum image characteristics found in the electronic document 135 (i.e. identified from the analysis of the document elements). Upon selecting and inserting the original candidate images, the VR mapping module 138 initiates an N-gram text analysis of the text elements of the electronic document 135 and initiates an online search query as described in block 320 above. This identifies additional candidate images from online sources to supplement the original images that were already extracted from the electronic document 135 and mapped to the virtual reality module 140. The VR mapping module 138 inserts the additional candidate images into the virtual reality module 140 at positions relative to the original candidate images. For example, assume the VR mapping module 138 identifies a first image within the electronic document that includes the minimum image characteristics. The first image is a photograph of a first portion of a real world environment. Also assume that the VR mapping module 138 also identifies an external candidate image from an online image search that reveals a second portion of the real world environment to complete a 360 degree panoramic image of the real-world environment. The VR mapping module 138 then maps the two images to the virtual reality module 140 by stitching together the two images.

In addition to using the N-gram text sequences to initiate online search queries for additional images relevant to the document content, the N-gram text sequences may be used by the VR mapping module 138 to identify text fragments from the document elements to use as text objects in annotation layers, supplementing the process described above with respect to blocks 250-260 in FIG. 2. FIG. 5 depicts an example of identifying, using N-gram sequences, text fragments may be used as text annotation layers in the virtual reality module 140.

The VR mapping module 138 identifies a top X number of N-gram sequences and identifies the sentences within the electronic document 135 that include two or more of the top X number of N-gram sequences (X being a programmable value). For example, in FIG. 5, the VR mapping module 138 selects the top four N-gram sequences of "Berlin Teufelsberg", "Station Berlin", "Field Station", and "spy station" and identifies the sentences in the electronic document that include two or more of these sequences (referred to herein as "co-occurring N-gram sentences"). The VR mapping module 138 also identifies the line numbers and the position in the electronic document these co-occurring N-gram sentences appear.

The N-gram extraction process described herein is thus used to sample the electronic document content text to find candidate annotation sentences. The VR mapping module 138 uses the co-occurring N-gram sentences as annotation layers in the virtual reality module 140. The co-occurring N-gram sentences are inserted automatically into the virtual reality image scene in the virtual reality module 140 or selected and positioned by the user via a guided process. For example, in an automated process, the VR mapping module 138 inserts the co-occurring N-gram sentences as annotation layers in the virtual reality image at locations according to the relative proximity of the original text to the original electronic document image.

In additional embodiments, the VR mapping module 138 adds additional content found within the electronic document 135 and identified from online services 109 and related to the content in the electronic document 135 as additional annotation layers. Additional content found within the electronic document 135 comprises, for example, other forms of text provided by an author of the electronic document (e.g., sticky notes, user defined metadata, edit comments). Additional content found within the electronic document 135 may be added as annotation layers one or more of the images selected for insertion in the virtual reality module 140.

Additional content identified from online services 109 comprises, for example, authoritative commentary on topics of the electronic document 135 (e.g, academic PDF content written by domain name experts), social media posts and commentary regarding the topics of the electronic document 135, and analytics, statistical sources, or visualizations relevant to the topics. The topics in the electronic document refer, for example, to the top X N-gram sequences of text as discussed above. Using a similar process as discussed above with respect to bock 320, the VR mapping module 138 initiates search queries in online search engines, social media platforms, and other external sources to identify additional sources of content related to the topics of the electronic document 135 for insertion into the virtual reality module 140.

FIGS. 6-9 depict examples of different views of a virtual reality environment generated through techniques described herein, showing various annotation layers as the user manipulates the virtual reality view. The views of the virtual reality environment shown in FIGS. 6-9 are generated from a PDF document providing information on Teufelsberg, a tourist site in Germany that held a former NSA listening station. Each of the views in FIGS. 6-9 is a screenshot from the viewpoint of a user of virtual reality viewer device 106 as the user manipulates and navigates the virtual reality environment.

Figure 6:
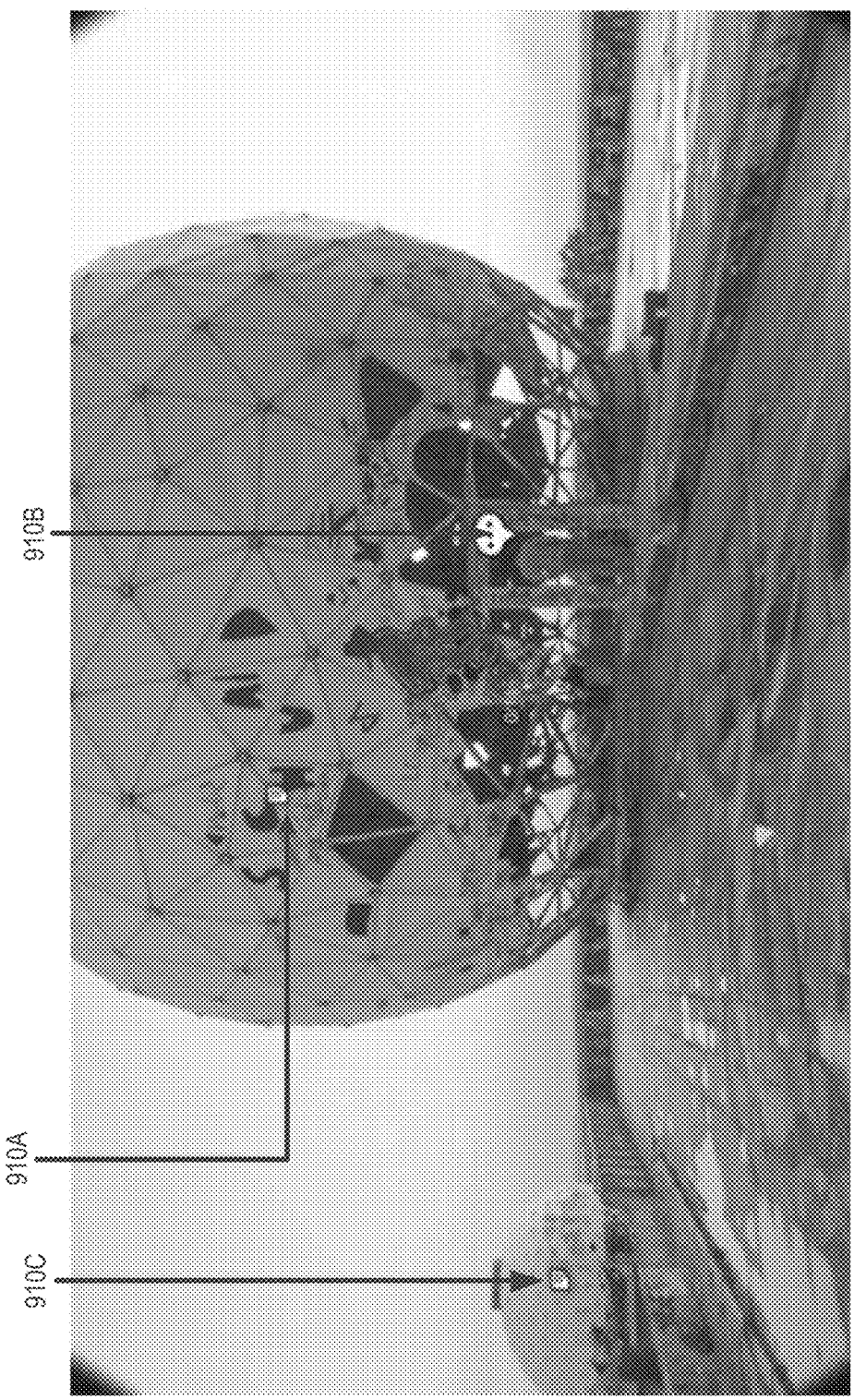
FIG. 6 is a first view of a virtual reality environment generated using techniques of certain embodiments disclosed herein.

FIG. 6 depicts one viewpoint in the virtual reality environment from the perspective of a user viewing the scene of Teufelsberg. The virtual reality module 140 executing in virtual reality viewer device 106 and presenting the view in FIG. 6 also includes text annotation layers through the process described above in FIGS. 2 and 3. Annotation indicators 910a, 910c are visual indicators depicting locations of text annotations (i.e. text annotations extracted from the electronic document 135 and mapped to the virtual reality module 140). Annotation indicator 910b is a visual indicator depicting the location of a social media annotation (e.g., text found as social media commentary from online sources 109). Via annotation indicators 910a-c, the system depicts to the user the number of remaining text annotations to discover or read.

FIG. 7 depicts a second viewpoint of the virtual reality environment as the user navigates around the virtual reality environment, centering the virtual reality view (e.g., by moving the virtual reality viewer device 106) on annotation indicator 910a from FIG. 6. As the user centers the view on text annotation layer 910a, the executing virtual reality module 140 begins to present the inserted text annotation layer 1010 as a pop up window.

FIG. 8 depicts a third viewpoint of the virtual reality environment as the user centers the view on the annotation layer 1010. The annotation layer pop up window expands into text annotation layer 1110, which comprises a text sentence extracted from the electronic document 135 through the processes discussed above with respect to FIGS. 2 and 3.

Figure 9:
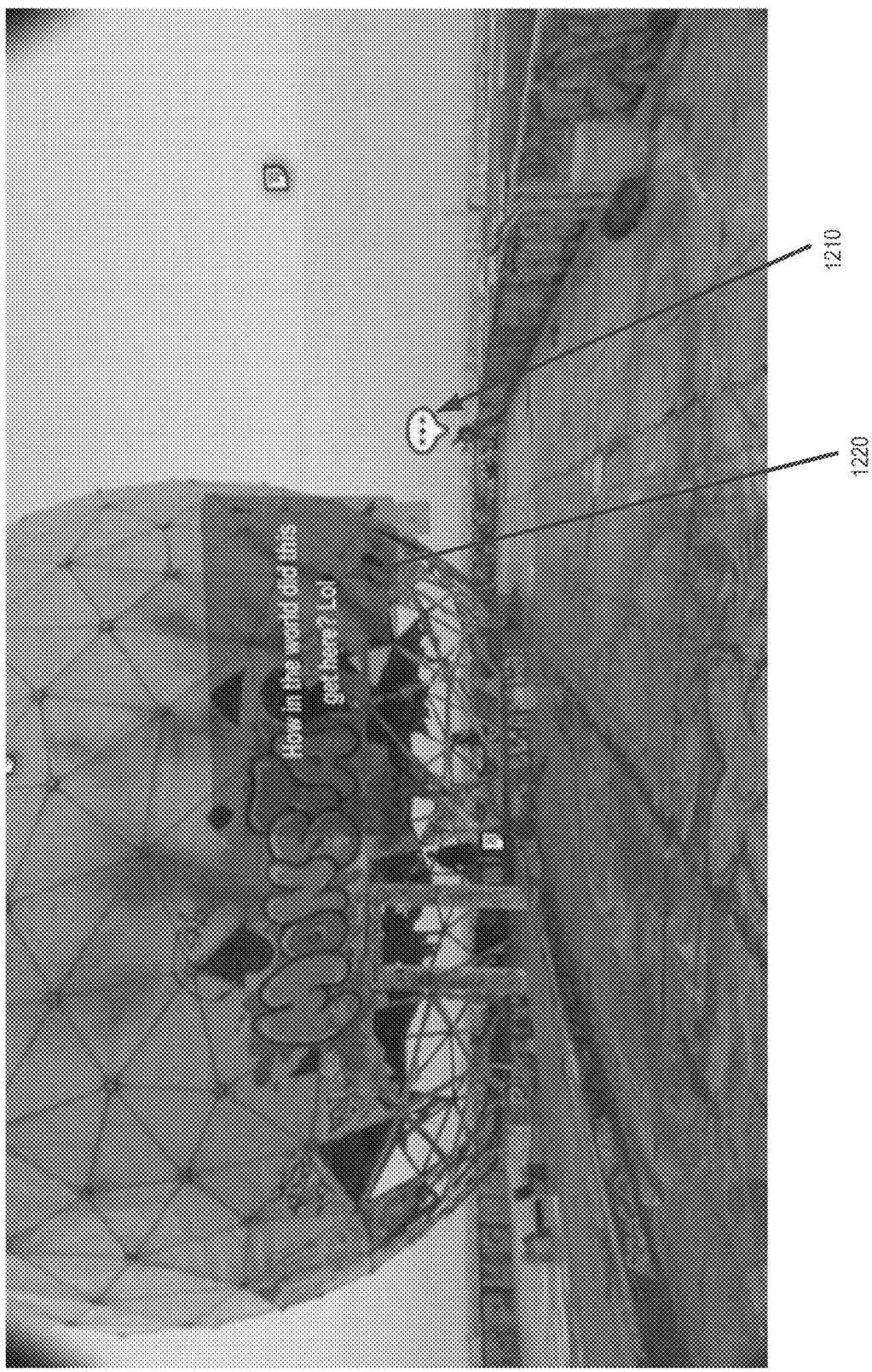
FIG. 9 is a fourth view of a virtual reality environment generated using techniques of certain embodiments disclosed herein.

FIG. 9 depicts a fourth viewpoint of the virtual reality environment as the user navigates and centers the view on a social media annotation 1210. Upon centering the view on the social media annotation 1210, the executing virtual reality module 140 presents a social media text comment 1220 extracted from a social media online source 109 via the process described above.

Accordingly, using the techniques described herein, a user is able to explore the content of a linearly presented electronic document in a non-linear explorative fashion. To explore the generated virtual reality environment, the virtual reality viewer application 108 is configured to process user inputs such as the direction of the user's gaze or virtual touch. For example, the virtual reality module 140, when executing, allows full page annotation box text to be viewed in a touch and gaze-enabled scrollable text area. The user's eye gaze may be detected for bringing pages forward for close up reading and for closing the text area (e.g., text area shown in text annotation layer 1110 in FIG. 8). Further, the virtual reality viewer application 108 interprets the user's hand gestures for swiping to navigate the virtual reality environment, allowing the user to navigate the content of the electronic document via hand swipes and eye gazes.

To move between pages or scenes (e.g., different VR images found within different pages of an electronic document, or among different images found from internal and external/online sources), the virtual reality viewer application 108 presents a teleportation portal in the virtual reality environment. The teleportation portal is a visual indicator to the user that indicates to the user that the user is able to navigate to a different scene/image by interacting with the portal. FIGS. 10 and 11 depict different scenes in a virtual reality environment where the user navigates from a first part of the environment to a second part of the environment via a teleportation portal.

Specifically, FIG. 10 depicts a view in Teufelsberg in which the user comes across a teleportation portal 1310, an indicator in the virtual reality environment shown by a red door. The viewer application 108 processes the user inputs (e.g., eye gazes and hand gestures) to interpret if the user is attempting to interact with the teleportation portal 1310. Through eye gaze or hand gesture, the user enables the teleportation portal 1310, and the next scene of the virtual reality environment is loaded from the virtual reality module 140 to the viewer application 108. FIG. 11 depicts an image of the next scene from the user's perspective as the user navigates from one virtual reality scene shown in FIG. 10 to another.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The invention claimed is:

1. A method for generating a virtual reality module from an electronic document by mapping image and text content from the electronic document to the virtual reality module, the method comprising:
   analyzing an electronic document to identify document elements occurring in the electronic document;
   parsing the document elements to identify original candidate images in the electronic document;
   generating a plurality of N-gram sequences of text from the document elements, the N-gram sequences of text indicating a probability of the text occurring within a portion of the electronic document;
   selecting at least one of the plurality of N-gram sequences of text for an online search query to identify additional images comprising minimum image characteristics, wherein the minimum image characteristics include at least a field of view value above a minimum threshold and the additional images are identified from one or more online sources; and
   inserting at least one of the additional images into the virtual reality module at positions relative to at least one of the original candidate images, wherein, upon execution of the virtual reality module by a virtual reality device, the at least one of the additional images is presented in a virtual reality environment to a user.

2. The method of claim 1, further comprising:
   identifying the original candidate images in the electronic document comprising the minimum image characteristics; and
   inserting at least one of the original candidate images into the virtual reality module.

3. The method of claim 1, wherein analyzing the electronic document generates a document object model for the electronic document, the document object model presenting the document elements in reading order.

4. The method of claim 1, further comprising:
   identifying relative positions of text elements and image elements from the document elements;
   for the at least one of the additional images selected for insertion into the virtual reality module at the positions relative to the at least one of the original candidate images, selecting one or more of the text elements that are positioned within a threshold proximity of the at least one of the original candidate images; and
   inserting the one or more of the text elements positioned within the threshold proximity of the at least one of the original candidate images as an annotation layer on the at least one of the additional images in the virtual reality module.

5. The method of claim 1, further comprising:
   selecting one or more co-occurring N-gram sentences from the plurality of N-gram sequences of text for insertion into the virtual reality module as annotation layers; and
   inserting selected co-occurring N-gram sentences as annotation layers on the at least one of the additional images in the virtual reality module.

6. The method of claim 1, wherein parsing the document elements to identify the original candidate images comprises:
   presenting a set of the original candidate images on a user interface controlled by an author; and
   receiving, from the author, a user input identifying the at least one of the original candidate images from the set of the original candidate images.

7. The method of claim 1, further comprising:
   analyzing the electronic document to identify a set of additional annotation layers, the set of additional annotation layers comprising one or more of sticky notes, user defined metadata, or edit comments; and
   inserting the set of additional annotation layers on the at least one of the additional images in the virtual reality module.

8. A computing system, comprising:
   a processor; and
   a memory communicatively coupled to the processor, wherein the processor is configured to execute instructions included in the memory to perform operations comprising:
   analyzing an electronic document to identify document elements occurring in the electronic document;
   parsing the document elements to identify original candidate images in the electronic document;
   generating a plurality of N-gram sequences of text from the document elements, the N-gram sequences of text indicating a probability of the text occurring within a portion of the electronic document;
   selecting at least one of the plurality of N-gram sequences of text for an online search query to identify additional images comprising minimum image characteristics, wherein the minimum image characteristics include at least a field of view value above a minimum threshold and the additional images are identified from one or more online sources; and
   inserting at least one of the additional images into a virtual reality module at positions relative to at least one of the original candidate images, wherein, upon execution of the virtual reality module by a virtual reality device, the at least one of the additional images is presented in a virtual reality environment to a user.

9. The computing system of claim 8, wherein the processor is configured to execute instructions included in the memory to perform operations further comprising:
   identifying the original candidate images in the electronic document comprising the minimum image characteristics; and
   inserting at least one of the original candidate images into the virtual reality module.

10. The computing system of claim 8, wherein analyzing the electronic document generates a document object model for the electronic document, the document object model presenting the document elements in reading order.

11. The computing system of claim 8, wherein the processor is configured to execute instructions included in the memory to perform operations further comprising:
   identifying relative positions of text elements and image elements from the document elements;
   for the at least one of the additional images selected for insertion into the virtual reality module at the positions relative to the at least one of the original candidate images, selecting one or more of the text elements that are positioned within a threshold proximity of the at least one of the original candidate images; and
   inserting the one or more of the text elements positioned within the threshold proximity of the at least one of the original candidate images as an annotation layer on the at least one of the additional images in the virtual reality module.

12. The computing system of claim 8, wherein the processor is configured to execute instructions included in the memory to perform operations further comprising:
   selecting one or more co-occurring N-gram sentences from the plurality of N-gram sequences of text for insertion into the virtual reality module as annotation layers; and
   inserting selected co-occurring N-gram sentences as annotation layers on the at least one of the additional images in the virtual reality module.

13. The computing system of claim 8, wherein parsing the document elements to identify the original candidate images comprises:
   presenting a set of the original candidate images on a user interface controlled by an author; and
   receiving, from the author, a user input identifying the at least one of the original candidate images from the set of the original candidate images.

14. The computing system of claim 8, wherein the processor is configured to execute instructions included in the memory to perform operations further comprising:
   analyzing the electronic document to identify a set of additional annotation layers, the set of additional annotation layers comprising one or more of sticky notes, user defined metadata, or edit comments; and
   inserting the set of additional annotation layers on the at least one of the additional images in the virtual reality module.

15. A non-transitory computer-readable medium embodying program code executable by a computing system, wherein the program code is executable to perform operations comprising:
   a step for analyzing an electronic document to identify document elements occurring in the electronic document;
   a step for parsing the document elements to identify original candidate images in the electronic document;
   a step for generating a plurality of N-gram sequences of text from the document elements, the N-gram sequences of text indicating a probability of the text occurring within a portion of the electronic document;
   a step for selecting at least one of the plurality of N-gram sequences of text for an online search query to identify additional images comprising minimum image characteristics, wherein the minimum image characteristics include at least a field of view value above a minimum threshold and the additional images are identified from one or more online sources; and
   a step for inserting at least one of the additional images into a virtual reality module at positions relative to at least one of the original candidate images, wherein, upon execution of the virtual reality module by a virtual reality device, the at least one of the additional images is presented in a virtual reality environment to a user.

16. The non-transitory computer-readable medium of claim 15, wherein the program code is executable to perform operations further comprising:
   a step for identifying the original candidate images in the electronic document comprising the minimum image characteristics; and
   a step for inserting at least one of the original candidate images into the virtual reality module.

17. The non-transitory computer-readable medium of claim 15, wherein analyzing the electronic document generates a document object model for the electronic document, the document object model presenting the document elements in reading order.

18. The non-transitory computer-readable medium of claim 15, wherein the program code is executable to perform operations further comprising:
   a step for identifying relative positions of text elements and image elements from the document elements;
   for the at least one of the additional images selected for insertion into the virtual reality module at the positions relative to the at least one of the original candidate images, a step for selecting one or more of the text elements that are positioned within a threshold proximity of the at least one of the original candidate images; and
   a step for inserting the one or more of the text elements positioned within the threshold proximity of the at least one of the original candidate images as an annotation layer on the at least one of the additional images in the virtual reality module.

19. The non-transitory computer-readable medium of claim 15, wherein the program code is executable to perform operations further comprising:
   a step for selecting one or more co-occurring N-gram sentences from the plurality of N-gram sequences of text for insertion into the virtual reality module as annotation layers; and
   a step for inserting selected co-occurring N-gram sentences as annotation layers on the at least one of the additional images in the virtual reality module.

20. The non-transitory computer-readable medium of claim 15, wherein the program code is executable to perform operations further comprising:
   a step for analyzing the electronic document to identify a set of additional annotation layers, the set of additional annotation layers comprising one or more of sticky notes, user defined metadata, or edit comments; and
   a step for inserting the set of additional annotation layers on the at least one of the additional images in the virtual reality module.

* * * * *